United States Patent [19]

Scott et al.

[11] 3,752,984
[45] Aug. 14, 1973

[54] METHODS AND SYSTEM FOR DETECTING SUBSURFACE MINERALS

[75] Inventors: Hubert D. Scott, Houston, Tex.; Robert E. Maute, Columbus, Ohio

[73] Assignee: Texaco Inc., New York, N.Y.

[22] Filed: Dec. 2, 1971

[21] Appl. No.: 204,071

[52] U.S. Cl............................250/261, 250/262
[51] Int. Cl. ............................................. G01t 1/18
[58] Field of Search .................. 250/83.6 W, 71.5 R

[56] References Cited
UNITED STATES PATENTS

| | | | |
|---|---|---|---|
| 3,413,472 | 11/1968 | Caldwell | 250/71.5 R |
| 3,413,471 | 11/1968 | Tittman | 250/71.5 R |
| 3,263,082 | 7/1966 | Caldwell | 250/83.65 |
| 3,108,188 | 10/1963 | Dewan et al. | 250/71.5 R |
| 2,905,826 | 9/1959 | Bonner et al. | 250/83.6 W |

Primary Examiner—James W. Lawrence
Assistant Examiner—Harold A. Dixon
Attorney—Thomas H. Whaley et al.

[57] ABSTRACT

An improved radiological borehole logging system and technique for detecting sulfur is provided for use in cased or uncased boreholes. The earth around the borehole is irradiated with neutrons, and pulses are generated which are representative of the number and energies of the resulting secondary gamma radiations. The pulses are sorted into a first group comprising a high energy range of gamma rays including sulfur-emitted gammas, and a second group comprising a lower energy range of gammas including those emitted by nuclei of calcium, silicon, chlorine and iron. The energy ranges are chosen so that the ratio of the count rates of these two groups will be substantially constant unless the irradiated formation happens to contain a significant number of sulfur nuclei. Accordingly, a change in the ratio may be taken as an indication of the presence of a sulfur-bearing formation, and the magnitude of the change will be functionally related to the relative proportion of sulfur in the formation.

18 Claims, 6 Drawing Figures

METHODS AND SYSTEM FOR DETECTING SUBSURFACE MINERALS

BACKGROUND OF THE INVENTION

This invention relates to methods and apparatus for making subsurface earth investigations, and more particularly relates to improved radiological well logging methods and apparatus to determine the presence of sulfur in an earth formation traversed by a borehole.

It is well known that sulfur is found in native form in various locations throughout the world. In addition, sulfur occurs in abundance, in combination with other elements, in the form of subsurface deposits or layers of gypsum or anhydrite (calcium sulfate) which are common throughout the world. It is common practice to drill boreholes in the earth to find sulfur and other materials, and thus various techniques have been developed for determining the character and composition of the different strata which may be traversed by the borehole. Not only are there techniques for carrying the drill cuttings to the surface for analysis, but a plurality of methods and apparatus have been developed for taking cores and sidewall samples at preselected depths.

Although these sampling techniques are quite useful, they also have certain critical limitations on their general applicability. For example, cores and sidewall samples cannot be taken except from subsurface earth which has been contaminated, at least to some extent, by the drilling process. Furthermore, samples taken in this manner can only be representative of a very small part of the earth which has been tapped.

Drill cuttings will, of course, be derived from each and every different depth to which the borehole penetrates. If the cuttings are "washed" to separate them from the drilling mud, this will inherently also remove other subsurface earth material of obvious significance. Even if this difficulty is avoided, however, it must be recognized that cuttings from one layer at one depth will necessarily be commingled with other cuttings from other layers at other depths before any cuttings can be carried all of the way up a borehole and recovered at the surface.

For these and other reasons, it has long been sought to develop a dependable logging technique or system which can be used to locate sulfur or sulfur-bearing strata, but which can also be used in the same way borehole logging measurements are conducted to locate oil and gas. Petroleum logging systems and methods such as those disclosed in U. S. Pat. No. 3,413,472, have been proposed for the purpose of identifying a gypsum or anhydrite formation which has been encountered. Such a technique is primarily intended to determine the lithology of the material adjacent the borehole, however, and is not particularly suitable for detecting the presence of sulfur as such.

These disadvantages of the prior art are overcome with the present invention, however, and novel radioactivity well logging methods and apparatus are hereinafter provided which develop a direct and specific indication of the presence of sulfur adjacent or surrounding a borehole in the earth.

SUMMARY OF INVENTION

In an ideal embodiment of the present invention, a prospecting system is provided which includes a subsurface sonde or elongated fluid-tight logging instrument containing an encapsulated neutron source, a suitable radiation detector capable of providing an energy-dependent indication of incident gamma rays, and a sleeve disposed about the portion of the sonde encompassing the detector and formed of a suitable neutron-absorbing material such as boron.

The instrument or sonde is preferably suspended in the borehole at one end of a conventional logging cable which has its other end connected to suitable electronic equipment located at the surface of the earth. Accordingly, the sonde is raised gradually to the surface of the earth while it irradiates the surrounding earth with neutrons. These neutrons will engage in various different interactions with nuclei of the adjacent earth material, and in many instances these nuclei will react to emit gamma rays having initial energies which are functionally related to the emitting nuclei. Although such gamma radiation may be scattered in every direction, a representative number of these gamma rays may be assumed to enter the borehole and strike the detector. Accordingly, circuitry is preferably included which generates electrical indications of the incidence and energies of these detected gamma rays, and these indications may be conducted to the surface by way of the logging cable.

At the surface, the indications will preferably take the form of a voltage pulse for each incident gamma ray, and each pulse will preferably have an amplitude which is a function of the energy of the gamma ray to which the pulse is related. Accordingly, different discriminators or other pulse height selection circuitry may be used to select and count those pulses within the energy ranges having significance with respect to sulfur in the earth, and count rate meters may be further included for generating a signal directly related in magnitude to the rate of occurrence of the pulses being counted in each of these energy ranges. These count rate signals may then be recorded in a conventional manner together with a correlative indication of borehole depth. Preferably, the gamma ray voltage pulses may be input to a digital multichannel pulse height analyzer, and the number of counts in each energy range output therefrom in digital form for recording or for use in a digital computer computation.

It is well known to select pulses which correspond to gamma rays emitted from a preselected type of nucleus, and to determine the rate of occurrence of such pulses as an indication of the presence and extent of the related element. Such measurements can be performed quite accurately when made under laboratory conditions with a sonde which is surrounded by a homogeneous medium. When such measurements are performed in a borehole in the earth, however, it must be appreciated that the resulting gamma ray spectra will be affected by factors such as the type and thickness of the borehole casing, the lithology of the surrounding earth, the porosity of the surrounding earth, the size of the borehole and the character of any fluids which may have collected therein, and even the position of the sonde in the borehole. To minimize the effect of these factors on a measurement of the pulses in the selected energy range, it is proposed instead to also establish a second lower energy range and to derive a second electrical pulse rate signal from this second range. Thus, the measurement is made of the ratio of the pulses detected in the high energy range to the pulses occurring in the preselected low energy range, and preferably it is this ratio signal which is recorded.

It is known that those gamma rays issuing from most neutron-irradiated earth formations with energies greater than 2.3 Mev. will be mostly from nuclei of calcium, silicon, chlorine and iron (if the borehole is cased). Accordingly, if discriminators are provided with their trigger levels set to establish a low energy window immediately below a high energy window, or if such windows are set on a digital multichannel pulse height analyzer, and if the ranges of these windows are set as hereinafter described, the ratio of the counting rates obtainable from these two windows will usually be substantially the same, irrespective of any variances which may occur in the proportions of these four elements.

If the formation contains sulfur, however, the count rate for the high energy window will be substantially increased. Accordingly, when a sulfur-bearing formation is encountered, this will be indicated by a shift in the ratio between the two windows which will be functionally related to the proportion of sulfur in the irradiated formation.

Any type of neutron source can be used for present purposes, provided the source emits neutrons in sufficient number. Thus, the neutron source may be an ion accelerator of conventional design, or it may be an encapsulated mixture of beryllium and either radium, actinium, plutonium, or americium. If a neutron source such as an accelerator is selected, however, the emitted neutrons may engage in activation and inelastic scattering reactions with oxygen nuclei, and this tends to produce a large number of gamma rays which are unrelated to the presence of sulfur, but which will nevertheless be detected.

Since both of the aforementioned oxygen reactions are threshold-type interactions, it will be apparent that an ideal neutron source for these purposes is one which generates neutrons which are less likely to engage in activation and inelastic scattering reactions with oxygen nuclei. Accordingly, an especially suitable source is either an encapsulated mixture of americium and boron, or an encapsulated quantity of californium-252 alone, since both these types of sources emit neutrons which are below the threshold for oxygen activation, and which engage in relatively few inelastic scattering reactions with oxygen nuclei.

Gamma rays produced by the neutron source may be eliminated or substantially reduced in number by disposing the neutron source within a lead or other suitable gamma ray shield. Since most boreholes contain fluids of various types, a spacing may be provided between the neutron source and the gamma ray detector which will permit these fluids to further aid in absorbing source-emitted gamma rays which may escape the shield.

The lead shield disposed between the source and the detector will effectively absorb most of the gamma rays from the source, and it will also be apparent that such a shield is also useful to some degree for scattering neutrons from the source capsule. This will assist in preventing neutron activation of the detector crystal. It will also be apparent that a proportion of the neutrons from the source will be scattered and slowed in the borehole instead of penetrating the formation and that a proportion of these slowed or thermalized neutrons could be captured by iron nuclei in the steel instrument housing surrounding the detector.

The iron nuclei which capture the thermalized neutrons will also emit gamma rays, and some will be detected. Since this will confuse the measurement sought to be made, it is desirable to surround the portion of the instrument housing about the detector with an external sleeve of boron or some other suitable neutron absorbing material. The boron shield thus acts as a neutron absorber to prevent significant neutron activation of the detector crystal and the production of iron capture gamma rays in the tool housing.

Fewer neutrons will reach the portion of the well casing surrounding the detector portion of the tool, of course, than will reach the portion of the casing immediately adjacent the neutron source portion of the tool. Accordingly, it is preferable to space the detector a distance from the source which is not only great enough to minimize detection of gamma rays escaping from the lead shield about the capsule, but also to minimize the number of gamma rays detected which are produced by neutron capture of the iron nuclei in the well casing. On the other hand, if the spacing is too great the detector will be moved out of the range of the flux of gamma rays being generated by neutron capture reactions in the adjacent earth. It will thus be apparent that the optimum source-to-detector spacing is an important feature of the invention.

The particular geometry of the sonde may, in some instances, be a factor in determining the most appropriate spacing to be selected, as well as the strength of the neutron source. However, it has been empirically determined that with a sonde having an encapsulated americium-boron mixture having an intensity of $1.33 \times 10^7$ neutrons per second, and with a scintillation counter having a thallium-activated sodium iodide crystal 2 inches in diameter and four inches in length, an optimum spacing will be 15.5 inches measured between the center of the crystal to the center of the capsule.

These and other features of the present invention will be apparent from the following detailed description, wherein reference is made to the figures in the accompanying drawing.

DETAILED DESCRIPTION

Figure 1:
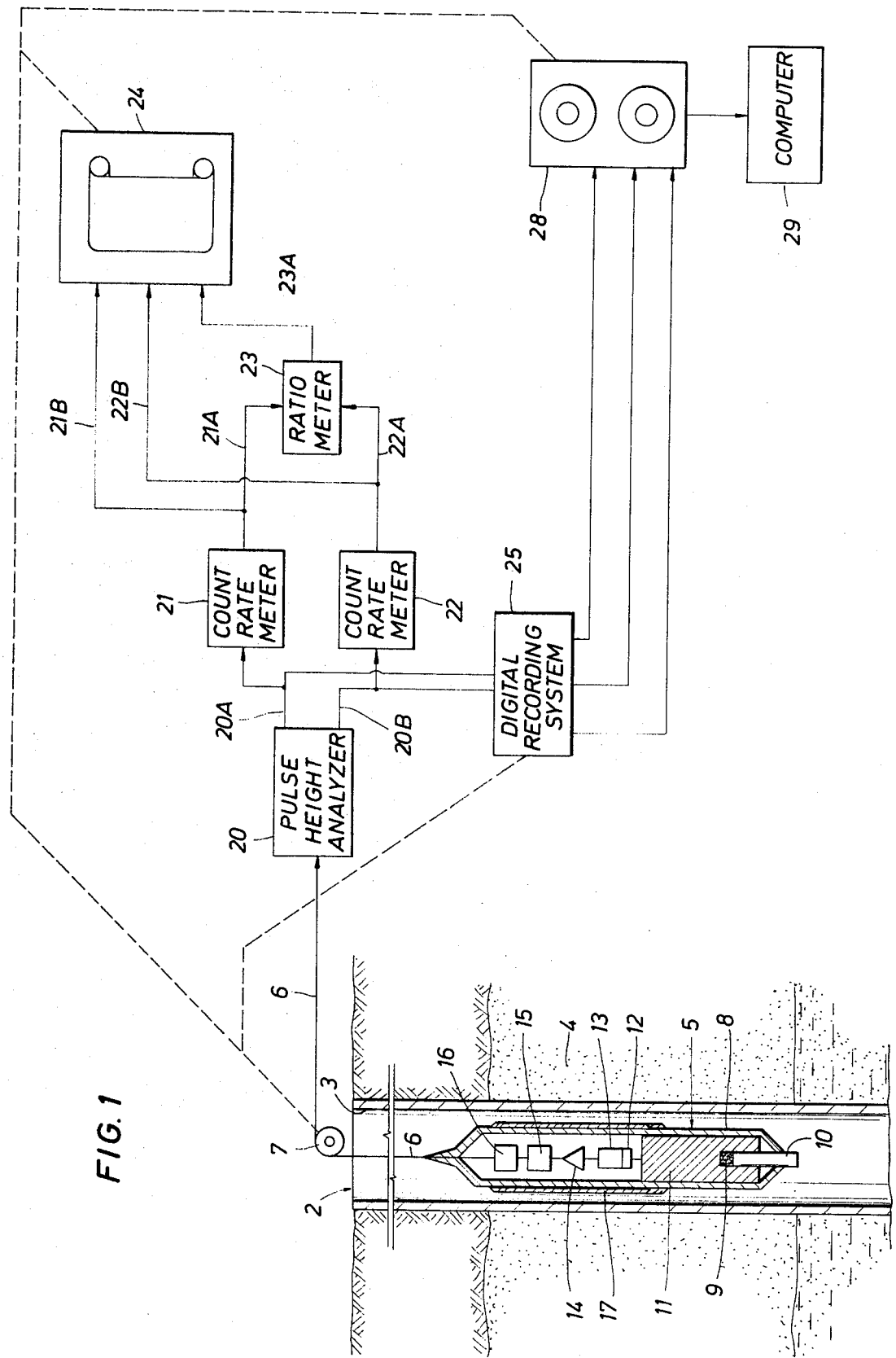
FIG. 1 is a simplified functional representation of a radioactivity well logging system embodying the principles of the present invention.

Referring now to FIG. 1, there may be seen a simplified functional representation of a subsurface earth formation 4 traversed by a borehole 2 containing a steel well casing 3 of conventional design. A sonde or subsurface logging instrument 5 may also be seen suspended in the casing 3 from one end of a well logging cable 6, whereby the instrument 5 may be passed longitudinally through the borehole 2 for the purpose of generating indications of the character of the formation 4 and other earth strata traversed by the borehole 2.

The cable 6 is preferably passed over a sheave wheel 7 or other suitable measuring device which, in turn, may be suspended over the mouth of the borehole by any suitable means such as a derrick or other equipment not depicted in FIG. 1. The rotation of the sheave wheel 7 will provide a measurement of the length of the cable 6 in the borehole 2, and this provides a corresponding indication of the depth at which the instrument 5 is located in the borehole 2. As indicated by the dotted lines in FIG. 1, therefore, both the sheave wheel 7 and the opposite end of the cable 6 are preferably coupled to signal processing and recording equipment located at the surface of the earth, so that a depth indication may be recorded along with the data pertaining to sulfur detection.

Referring again to FIG. 1, the instrument 5 may be seen to be composed of an elongated steel housing 8 having a sheath 17 of boron or other suitable material about its upper portion, and containing a source of neutrons in its lower end for irradiating the earth surrounding the borehole 2 and at least one gamma ray detector preferably positioned in its upper end for sensing gamma radiation produced in the earth by such neutron bombardment. Any type of neutron source may be used to attain the basic objectives of the present invention, including any accelerator or pulsed source employing the well known deuterium-tritium reaction. Accordingly, the neutron supply may also be a capsule 9 containing a mixture of beryllium and an alpha-emitting substance such as radium, plutonium, americium or actinium. Alternatively, the capsule may contain only californium-252 alone. As will hereinafter be apparent, however, a particularly suitable source may be a capsule 9 filled with a powdered mixture of boron and americium, since a source of this type will emit gammas which are primarily only in the 60 Kev. energy range, and since the emitted neutrons are below 10 Mev. (the level required to produce unstable nitrogen-16 nuclei). The capsule 9 is preferably mounted on a source holder 10, which may conveniently be inserted into the lower end of the housing 8.

Referring now to the radiation sensing apparatus, it is essential to the objects of the present invention to provide an energy-dependent measurement of the gamma radiation produced by neutron capture by nuclei in the formation 4. Accordingly, there is preferably provided a scintillation counter assembly having a crystal 12 optically coupled to an end-window photomultiplier tube 13 of conventional design and located within the part of the housing 8 having the exterior shield 17. The incident gamma rays which are captured by the crystal 12 cause the photomultiplier tube 13 to generate pulses of functionally related amplitude which are preferably processed first by a preamplifier 14 and thereafter passed through a pulse height discriminator 15 to a cable driver circuit 16. The trigger level of the discriminator 15 is preferably set to minimize low energy count rate on the cable, and the output of the cable driver circuit 16 is coupled to the lower end of the logging cable 6 for transmission to the electronic processing and recording circuitry located at the surface.

Referring again to FIG. 1, the processing and recording circuitry preferably includes a digital pulse height analyzer 20 having at least two "windows." As will hereinafter be explained, the "high window" is preferably set to accept and pass only those pulses received from the cable 6 with amplitudes corresponding to energies greater than about 4.23 Mev. and not greater than 4.88 Mev., and the "low window" will pass only those pulses with amplitudes corresponding to energies greater than about 3.52 Mev. and not greater than 4.23 Mev. The digital output signal 20A from the high window of pulse height analyzer 20 is applied to a first analog count rate member 21, and the digital output signal 20B is preferably applied to a second analog count rate meter 22.

It is a function of the analog count rate meters 21 and 22 to convert these digital output signals to analog form and to generate output voltages functionally related in magnitude thereto. Accordingly, the output voltage from the first count rate meter 21 is applied as voltage 21A to one of the two inputs of a suitable analog ratio meter 23 and as voltage 21B to one of the inputs of a conventional chart recorder 24. Similarly, the output voltage 22A of the count rate meter 22 is supplied to a second input of analog ratio meter 23 and is also supplied as voltage 22B to a second input of chart recorder 24. The output voltage 23A of the analog ratio meter 23 which comprises a voltage proportional to the ratio of the two inputs is supplied to a third input of the chart recorder 24 whose record medium, it will be recalled, is moved as a function of borehole depth through its linkage with the sheave sheel 7. Thus, the analog circuitry 21, 22 and 23, which may be of any of the known types suitable for this purpose, provides a direct real time recording of the count rates in each energy window and the ratio of these count rates, all these being recorded as a function of borehole depth.

Alternatively, if desired, the output signals 20A and 20B from the digital pulse height analyzer 20 may be supplied to a digital tape recording system 25. The digital recording system 25 comprises suitable control and buffer storage circuitry for processing the digital numbers provided to its inputs and supplying those numbers in appropriate format and sequence for recording on a digital tape recorder 28. Depth information is also supplied from the sheave wheel 7 to the digital recording system 25 and recorded on the magnetic tape by tape recorder 28 along with the count information from the pulse height analyzer 20. These taped outputs may then be used as desired with a suitable digital computer 29 to compute the ratios of the counts in the two energy windows as a function of borehole depth and to output the results in any of the suitable digital computer output forms (not depicted), such as strip chart records, cathode ray tube displays or line printer outputs, as desired. The digital computer 29 used for this purpose may be any of the well known available types such as the CDC 3500 or IBM 360 or 370 system. The computer programs to perform such calculations and displays when given an input tape in a specified format would be readily apparent to a programmer of average skill and hence need not be elaborated further.

As previously stated, the portion of the prompt gamma ray spectra above about 2.3 Mev., which is produced by neutron irradiation of subsurface earth materials, is substantially composed of gamma rays resulting from neutron capture by nuclei of calcium, silicon, chlorine, and, if the casing 3 is present in the borehole 2, iron. Accordingly, if the two windows of the pulse height analyzer 20 are set so that the ratio of the pulses in signal 20A to the pulses in signal 20B (the HW:LW ratio) is the same for these four elements, then any combination of these four elements in any earth formation 4 will yield the same HW:LW ratio. On the other hand, when the formation 4 is composed of sulfur, gypsum, anhydrite, pyrite, or some other mineral of a high sulfur content, the HW:LW ratio will be different but independent of such factors as the condition of the casing 3, the character of the fluids therein, the size of the borehole 2, and the lithology and porosity of the formation 4.

Referring now to FIG. 2, there may be seen a series of graphic representations of the prompt gamma ray spectra taken with a tool of the type shown in FIG. 1 which are produced by neutron bombardment of each of the aforementioned elements, and showing the relative intensities of gamma rays of energies falling within each of the aforementioned two windows of the pulse height analyzer 20 in FIG. 1. Thus, it may be seen in FIG. 2E that the iron spectrum 34 exhibits peaks 34A–C at 7.64 Mev., at 7.13 Mev., and at 6.62 Mev., respectively. These peaks 34A–C are characteristic of a sodium iodide crystal 12, which is at least 2 inches in diameter, and which is four inches or greater in length, and is a result of the well known pair production reaction.

Figure 2A:
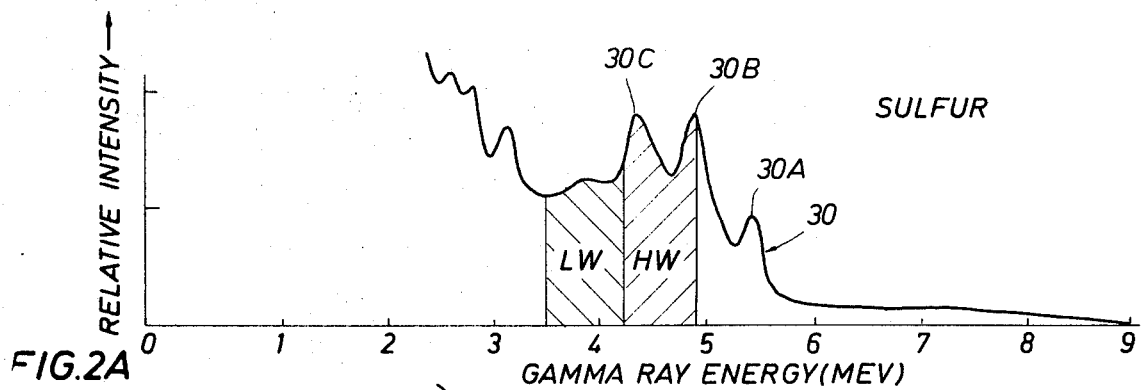
FIGS. 2A-2E are a simplified representation of the various secondary gamma radiation spectra which may be obtained for neutron bombardment and capture of each of a plurality of different preselected elements in a borehole geometry with a tool as shown in FIG. 1.

Referring now to FIG. 2A, it may be seen the sulfur spectrum 30 exhibits characteristic peaks 30A–C at 5.44 Mev., at 4.93 Mev., and at 4.42 Mev., respectively. As hereinbefore mentioned, the high window of the pulse height analyzer 20 is preferably set at a 4.23–4.88 Mev. range, and its low window is preferably at a 3.52–4.23 Mev. range. Thus, it will be apparent that only the resonance peaks 30B–C are normally within the scope of the two windows of the pulse height analyzer 20.

Figure 2B:
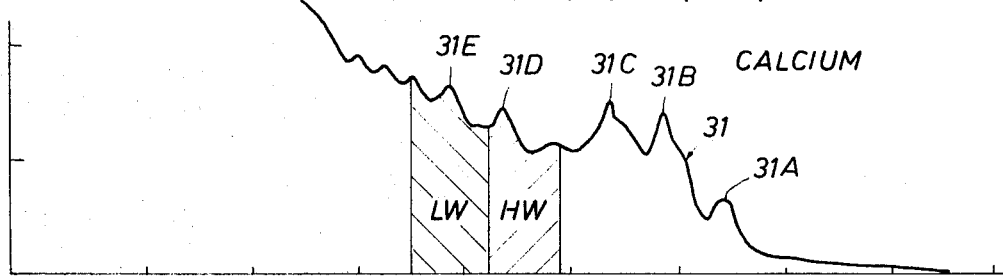

Referring to FIG. 2B, it may be seen that the calcium spectrum 31 exhibits peak 31A at 6.41 Mev., another peak 31B at 5.90 Mev., and a third peak 31C of substantial magnitude at 5.39 Mev. In addition, however, a fourth peak 31D of importance is clearly exhibited at 4.42 Mev., and a fifth peak 31E contributes 3.91 Mev. pulses to signal 20B.

Figure 2C:
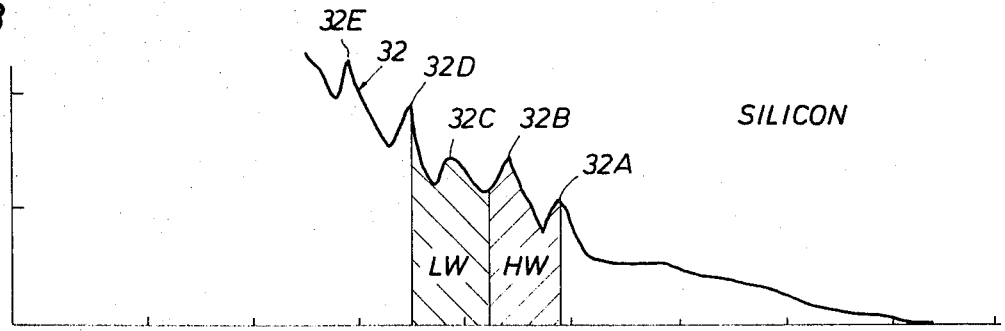

The silicon spectrum 32, which is depicted in FIG. 2C, will also be seen to exhibit more than three characteristic peaks. Besides the three peaks 32A–C, which produce pulses of 4.93 Mev., 4.42 Mev., and 3.91 Mev., respectively, there may also be seen two additional peaks 32D and 32E at 3.54 Mev. and 3.03 Mev., respectively. The lower energy peak is not pertinent to the present invention, however, if the two windows of the pulse height analyzer 20 are set as recommended.

Figure 2D:
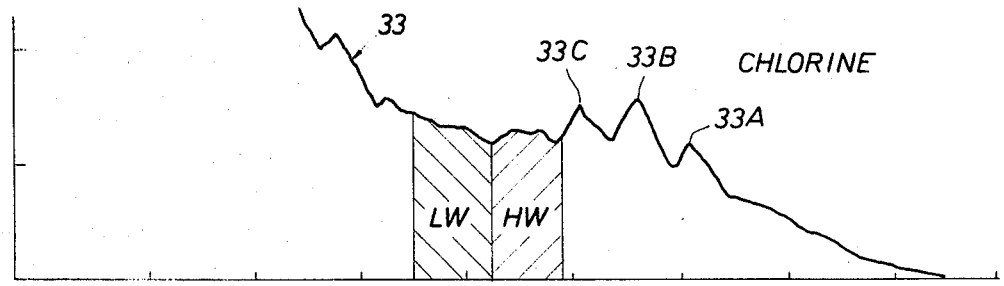
Figure 2E:
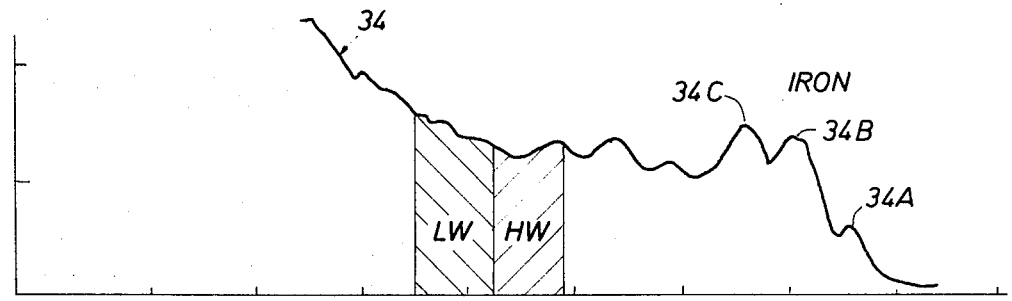

Referring now to FIG. 2D, it will be seen that the chlorine spectrum 33 exhibits three peaks 33A–C. More specifically, the peak 33A will contribute 6.12 Mev. pulses to the output signal from the photomultiplier tube 13, the lower energy peak 33B will contribute 5.61 Mev. pulses, and the lowest peak 33C will contribute 5.10 Mev. pulses.

It will be appreciated by close inspection of the shaded areas labelled HW and LW in FIGS. 2B–2E that the ratio of the shaded areas (HW:LW) is approximately constant in each of the spectra. Thus, if all the spectra 2B–2E were combined, as by addition, into a single spectrum (as could occur in a borehole), the ratio HW:LW of the combined spectra would also be approximately constant. This effect is due to the placement of the windows in the spectrum. A small deviation in this placement (on the order of ± 100 Kev.) has been found to be acceptable without unduly disturbing this relationship, but the energy edges located as indicated in FIG. 2 are considered to be substantially optimum for this invention. An inspection of the ratio of areas HW:LW in FIG. 2A, however, clearly shows that this ratio would be greater due to the preponderance of the sulfur peaks 30B and 30C. This preponderance would remain if all the spectra 2A–2E were combined as, for example, by addition. Thus, the ratio HW:LW is a reliable indication of the presence of sulfur, even in the presence of varying borehole constituents and formation lithologies.

It will be appreciated by those skilled in the art that the actual location of the window edges in the energy spectrum will be a function of the detector crystal 12 diameter and length. Due to the relative size, constraint imposed on an instrument 5 which is intended for use in a borehole 2, the diameter of the crystal 12 cannot be substantially larger than as hereinbefore stated.

In those instances where the size of the borehole 2 is such as to permit the use of a crystal 12 of a different diameter, however, it may be desirable to reset the windows of the pulse height analyzer 20 to again obtain the optimum HW:LW ratio sought to be established. For example, it may in some instances be desirable to relocate the high and low window settings in locations other than adjacent each other on the spectra.

Turning again to FIG. 1, it should be noted that since the gamma radiation detected by the crystal 12 is only sampling of the total gamma ray flux permeating the borehole 2, it is desirable that a maximum number of gamma rays be detected in order for the resulting measurement to have meaning and utility. Accordingly, it is desirable that the cyrstal 12 be of at least the size hereinbefore described, and that an optimum source-detector spacing be provided within the instrument 5. The position of the neutron source in the borehole 2 will, of course, determine the location and limits of the "cloud" of gamma radiation entering the borehole 2 and casing 3 from the irradiated formation 4, and it will be apparent that a relatively longer source-detector spacing will tend to locate the crystal 12 away from the greater number of gamma rays sought to be detected. On the other hand, if the capsule 9 contains a gamma ray emitting substance, it should also be noted that much of the gamma ray flux within the immediate vicinity of the source will be composed of gamma rays emanating from the capsule 9 rather than from the neutron-bombarded formation 4. These unwanted gamma rays are greatly reduced in number, of course, if the capsule 9 is disposed within the lead shield 11 as hereinbefore discussed. However, it has been determined that if the capsule 9 is composed of a sufficient amount of americium and boron to emit neutrons at the rate of $1.33 \times 10^7$ intensity, an ideal source-detector spacing will be a distance of about 15.5 inches between the center of the capsule 9 and the center of a 4-inch long crystal 12.

Another factor contributing to the improvement of the statistical quality of the measurements to be derived by this invention, is the speed with which the instrument 5 is drawn through the borehole 2. Obviously, a slower logging speed will give more counts in the energy windows and hence a statistically better and therefore more reliable measurement than will a faster logging speed. Ordinarily, logging speeds of less than 15-20 feet per minute are impractical where it is necessary to survey the entire length of a well which may be several thousand feet or more deep.

A measurement which is intended to find sulfur will not be directed to deeper formations, however, and thus a logging speed as slow as three feet per minute can as a practical matter be tolerated for present purposes. Nevertheless, the invention can be practiced successfully with logging speeds on the order of 10 feet per minute or greater, which renders the present invention useful also for logging the deeper wells normally encountered in the petroleum industry.

Although it has been found particularly suitable for the purposes of the present invention to employ a single-unit crystal 12 which is formed of thallium-activated sodium iodide, other materials such as cesium iodide may also be employed. In addition, one or more additional radiation detectors (not shown) may also be included in the housing 8 for making other lithological measurements, since these additional measurements may be employed by the computer 29 for correlation with the signals provided by the ratio meter 23 as hereinbefore suggested.

Various other modifications and alternatives will be apparent which will be within the scope of the present invention. Accordingly, it should be clearly understood that the methods and structures hereinbefore described and illustrated in the accompanying drawings are exemplary only and are not intended as limitations on the scope of the invention.

What is claimed is:

1. A system for detecting and measuring sulfur in a subsurface earth formation traversed by a borehole, comprising an elongated steel housing adapted to be passed longitudinally through said borehole, a source disposed in said housing and emitting a flux of neutrons for bombarding nuclei in said formation, gamma ray detector means disposed in said housing and spaced from said source for generating electrical pulses functionally representative in occurrence and amplitude of the occurrence and energies of gamma rays in said borehole, a gamma ray shield disposed between said source and said detector, means for sorting pulses from said detector into a first pulse group composed of pulses with amplitudes corresponding to gamma rays within a first preselected energy range and into a second pulse group composed of pulses corresponding to gamma rays within a second lower preselected energy range, said first higher energy range being correlative with the energies of a substantial portion of the gamma rays resulting from thermal neutron capture reactions with sulfur nuclei in said formation and said second lower energy range being correlative with the energies of a substantial portion of the gamma rays resulting from thermal neutron capture reactions with nuclei of materials in the vicinity of the borehole but substantially above the 2.23 Mev hydrogen thermal capture gamma ray characteristic energy, and means for deriving an indication of the ratio of the rate of occurrence of said pulses in said first group to the rate of occurrence of said pulses in said second group.

2. The system described in claim 1, wherein said sorting means sorts said pulses according to ranges such that said ratio is substantially independent of the relative proportions of calcium, silicon and chlorine in the vicinity of the borehole.

3. The system described in claim 2, wherein the lower limit of said lower energy range is greater than about 2.3 Mev.

4. The system described in claim 3, wherein said first energy range is greater than about 4.23 Mev. and not substantially greater than about 4.88 Mev., and wherein said second energy range is greater than about 3.52 Mev. and not substantially greater than about 4.23 Mev.

5. The system described in claim 4, further comprising a thermal neutron shield disposed on said housing and encompassing said detector.

6. The system described in claim 5, wherein said detector is spaced above said gamma ray shield and said radiation source a distance such as to sense a relative maximum number of gamma rays resulting from thermal neutron capture reactions in said formation and a relative minimum number of gamma rays resulting from thermal neutron capture with iron nuclei in the vicinity of said borehole.

7. A system for detecting and measuring sulfur in a subsurface earth formation traversed by a borehole, comprising an encapsulated source of radioactive material adapted to be longitudinally passed through said borehole and for bombarding said formation with neutrons, a radiation detector spaced a preselected distance from said source for detecting gamma rays in said borehole as a result of thermal neutron capture reactions with nuclei in said bombarded formation, pulse generating means responsive to said detector for generating electrical pulses functionally representative in occurrence and amplitude to the incidence and energies of said detected gamma rays, pulse sorting means responsive to said generating means and establishing a high energy window for passing only pulses with amplitudes within a first energy range and establishing a low energy window for passing only pulses with amplitudes within a second lower energy range, said energy ranges together encompassing those pulses having amplitudes corresponding to the expected energies of gamma rays resulting from thermal neutron capture reactions with nuclei of calcium, silicon, chlorine and iron, but not hydrogen in the vicinity of the borehole, said higher energy range further encompassing those pulses having amplitudes corresponding to the expected energies of gamma rays resulting from thermal neutron capture reactions with any nuclei of sulfur in said bombarded formation, first count rate means responsive to said high energy window in said pulse sorting means for determining the rate of occurrence of those pulses passed with amplitudes within said higher energy range, second count rate means responsive to said low energy window in said pulse sorting means for determining the rate of occurrence of those pulses passed with amplitudes within said lower energy range, and ratio means for deriving a recordable indication of the ratio of said rates of occurrence.

8. The system described in claim 7, wherein said source of radioactivity is an encapsulated mixture of americium and boron.

9. The system described in claim 8, wherein said pulse sorting means further includes
first energy window means for registering input pulses with amplitudes corresponding to detected gamma rays with energies greater than about 4.23 Mev. and not substantially greater than about 4.88 Mev., and
second energy window means for registering input pulses with amplitudes corresponding to detected gamma rays with energies greater than about 3.52 Mev. and not substantially greater than about 4.23 Mev.

10. The system described in claim 9, further comprising a thermal neutron shield encompassing said detector.

11. The system described in claim 10, wherein the distance between said detector and said encapsulated mixture is substantially 15.5 inches.

12. A method of detecting and measuring sulfur in a subsurface earth formation traversed by a borehole, comprising
bombarding said formation with a flux of neutrons,
detecting gamma rays emanating from said bombarded formation and resulting from thermal neutron capture reactions with nuclei therein,
generating electrical pulses functionally related in occurrence and amplitude to the incidence and energies of said detected gamma rays,
sorting into a first group those pulses having amplitudes within a first preselected higher energy range,
sorting into a second group those pulses having amplitudes within a second preselected lower energy range,
said ranges together encompassing a substantial proportion of the detected gamma rays resulting from thermal neutron capture reactions with nuclei in the vicinity of the borehole but substantially exclusive of hydrogen capture gamma rays,
said high energy range further encompassing the substantial portions of detected gamma rays resulting from thermal neutron capture reactions with nuclei of sulfur in said bombarded formation, and
deriving a recordable indication of the ratio of the rate of occurrence of pulses in said first group to the rate of occurrence of pulses in said second group.

13. The method described in claim 12, wherein said energy ranges are selected such that the ratio is substantially independent of the relative proportions of said nuclei of calcium, silicon and chlorine in said formation and dependent on the substantial presence of sulfur nuclei therein.

14. The method described in claim 13, wherein said sorted pulses have amplitude greater than about 2.3 Mev.

15. The method described in claim 14, wherein said first energy range is greater than about 4.23 Mev. and not greater than about 4.88 Mev., and wherein said second energy range is greater than about 3.52 Mev. but not greater than about 4.23 Mev.

16. The method described in claim 15, further including generating said neutrons at an intensity of about $1.33 \times 10^7$ neutrons per second at a first location in said borehole, and detecting gamma rays at a second location spaced along said borehole about 15.5 inches from said first location.

17. A system for investigating the constituency of a subsurface earth formation traversed by a steel casing inserted in a borehole, comprising
an elongated steel housing adapted to be passed longitudinally through said casing,
a capsule disposed in the lower portion of said housing and containing a mixture of americium and beryllium,
a scintillation counter disposed in said housing above said capsule and having a sodium iodide crystal about 4 inches long spaced from said capsule a distance of 15.5 inches measurable between the center of said crystal and the near side of the capsule,
a gamma ray shield formed of a high density metal and disposed in said housing between said capsule and said crystal,
a sheath of boron disposed about the portion of said housing surrounding said scintillation counter for blocking thermal neutrons in said borehole from engaging in capture reactions with iron nuclei in said housing,
a logging cable for suspending said housing longitudinally in said casing and for conducting to the surface electrical pulses generated by said scintillation counter in functional correlation with the incidence and energies of gamma rays entering said borehole and casing as a result of neutron capture reactions with nuclei of said earth formation,
discriminating and sorting means located at the surface and interconnected with said cable for selecting and grouping into a first count rate signal those pulses having energies between 4.23 Mev. and 4.88 Mev. and for selecting and grouping into a second count rate signal those pulses having energies between 3.52 Mev. and 4.23 Mev.,
ratio means for deriving an analog ratio signal functionally related to the ratio of said first count rate signal to said second count rate signal,
digital signalling means for forming said first and second count rate signals respectively into functionally related first and second digital signals and said analog ratio signals into a functionally related digital ratio signal, and
recording means for correlatively recording said digital signals together with a functional indication of borehole depth.

18. A method of detecting and measuring sulfur in a subsurface earth formation traversed by a steel casing inserted in a borehole, comprising
generating a flux of neutrons and gamma rays at a first location in said casing adjacent said formation,
selectively interrupting and absorbing said gamma rays in said flux to permit substantially only said neturons to permeate through said casing and to slow to thermal energy in said formation.
detecting at a second location in said casing spaced a preselected distance above said first location gamma rays produced by capture reactions engaged in between said neutrons and nuclei of said formation,
selectively interrupting and absorbing at said second location neutrons arriving at said second location at thermal energy, generating electrical pulses having occurrences coincident with the detection of and having amplitudes corresponding to the energies of said gamma rays produced by capture reactions in said formation,
selecting and forming into a first pulse train those pulses having energies greater than 4.23 Mev. but not greater than 4.88 Mev.,
selecting and forming into a second pulse train those pulses having energies greater than 3.52 Mev. but not greater than 4.23 Mev.,
deriving the ratio of the pulse rate of said first pulse train to the pulse rate of said second pulse train, and
recording said derived ratio together with a correlative indication of the borehole depth of said first and second locations in said casing.

\* \* \* \* \*